June 6, 1967 H. G. WENDEROTH ETAL 3,323,713
SEALING ARRANGEMENT FOR ROTARY MECHANISMS
Filed Oct. 22, 1965 2 Sheets-Sheet 1

INVENTORS
HANS GEORG WENDEROTH
WALTER G. FROEDE
BY
ATTORNEY

INVENTORS
HANS GEORG WENDEROTH
WALTER G. FROEDE
ATTORNEY

United States Patent Office 3,323,713
Patented June 6, 1967

3,323,713
SEALING ARRANGEMENT FOR ROTARY
MECHANISMS
Hans Georg Wenderoth, Heilbronn, and Walter G. Froede, Neckarsulm, Wurttemberg, Germany, assignors to NSU Motorenwerke Aktiengesellschaft, Neckarsulm, and Wankel G.m.b.H., Lindau (Bodensee), Germany
Filed Oct. 22, 1965, Ser. No. 500,688
Claims priority, application Germany, Dec. 10, 1964,
N 25,960
13 Claims. (Cl. 230—145)

This invention relates to rotary mechanisms and in particular to a novel and improved sealing arrangement for said rotary mechanisms. Rotary mechanisms of the type described herein may take the form of that shown in United States Patent No. 2,988,065, issued on June 13, 1961, to Felix Wankel et al.

Rotary mechanisms of the type described herein normally comprise an outer body and an inner body or rotor, between which outer body and rotor there are defined a plurality of working chambers which during relative rotation of the rotor and outer body vary in volume. In order to promote efficient operation of the engine, the working chambers are preferably sealed from one another by providing sealing means between the outer body and rotor. It has been known in the past, such as for example, that shown in the above-mentioned patent, to provide radially movable sealing means between the outer periphery of the rotor and the inner periphery of the outer body and axially movable sealing means between the end faces of the rotor and the inner surfaces of the end walls of the outer body. In the present invention, it has been found that it is also possible to substitute radially movable sealing elements for at least some of the axially movable sealing elements which under certain conditions provides for a simpler sealing construction.

The present invention is generally carried out by substituting radially movable sealing elements, which seal between the rotor and crank shaft or members carried by said crank shaft, for the generally used axially movable oil sealing elements, which seal between the rotor and the end walls of the outer body. Additional radial sealing means may be provided between the outer body end walls and the crank shaft, which radial sealing means are axially spaced from the first-mentioned sealing means. The two aforementioned sealing means cooperate to prevent oil leakage of the lubricating oil provided for the bearings and for cooling the interior of the rotor into the working chambers. Means are also provided for preventing excessive pressure build-up between the sealing means so as to prevent a digging in of the seal means against their sealing surfaces due to too much pressure acting on said sealing means which may lead to a relatively rapid wearing of the seal elements.

Accordingly, it is one object of the invention to provide a novel and improved oil sealing arrangement for a rotary mechanism.

It is another object of the invention to provide a novel and improved sealing arrangement for a rotary mechanism wherein sealing means are provided between the crank shaft and the outer body and between the inner and outer body of said rotary mechanism, which seal means cooperate to prevent oil leakage into the working chambers of said rotary mechanism.

It is a further object of the invention to provide a novel and improved sealing arrangement for a rotary mechanism wherein means are provided for preventing excessive pressures from acting on said seal means so as to minimize wearing of said seal means.

Other objects and advantages of the invention will be best understood upon reading the following detailed description with the accompanying drawings wherein:

FIG. 5 is a cross-sectional view of one of the seal rings of the invention; and

Figure 1:
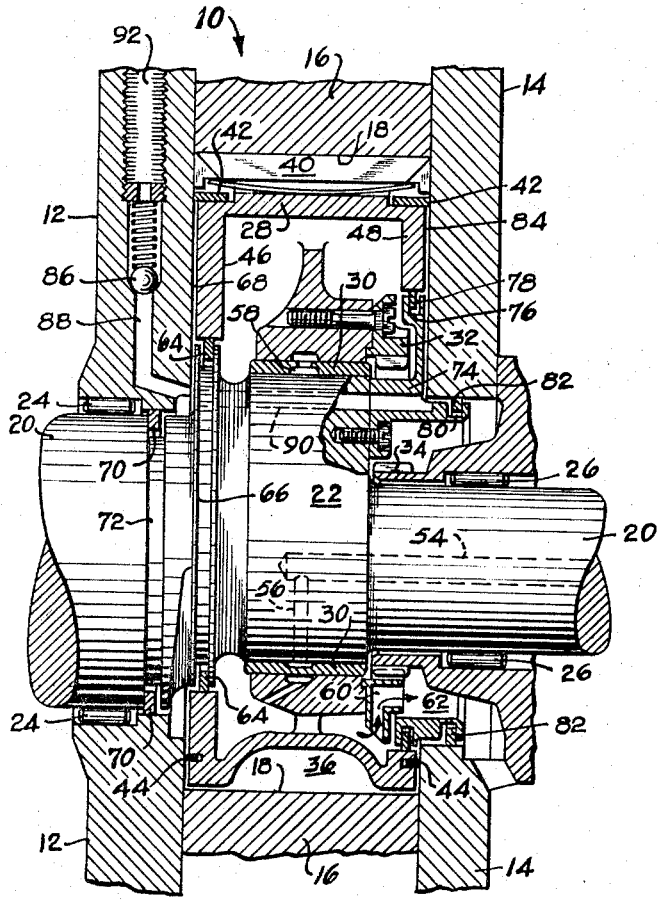
FIG. 1 is an axial sectional view embodying one form of the invention.
Figure 2:
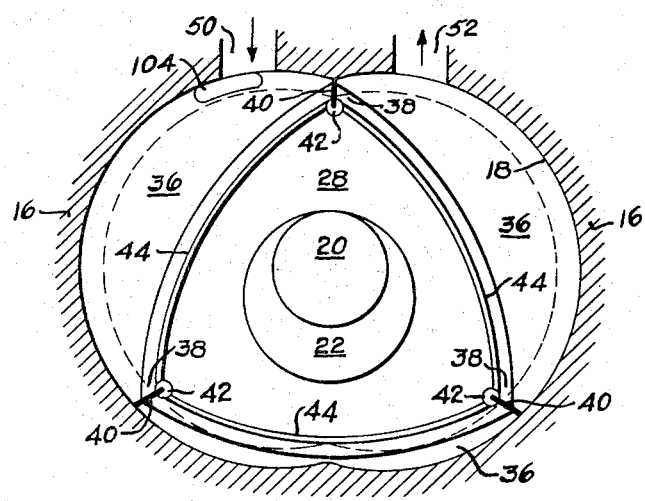
FIG. 2 is a cross-sectional view of the rotary combustion engine shown in FIG. 1.

Referring to FIG. 1, there is shown therein a rotary mechanism including an outer body 10 comprised of a pair of end walls 12 and 14 interconnected with a peripheral wall 16. As illustrated in FIG. 2, the profile of the inner surface 18 of the peripheral wall 16 is preferably basically an epitrochoid. A shaft 20 having an eccentric portion 22 thereon is supported in the outer body by suitable bearings 24 and 26 in the end walls 12 and 14, respectively. The bearings 24 and 26 shown in FIG. 1 are preferably roller-type bearings, but other suitable bearings may also be used.

A multi-lobed rotor 28 is supported on the shaft eccentric portion 22 by a bearing 30 with said rotor 28 being rotatable relative to said shaft and its eccentric portion. An internally-toothed gear 32 is carried by the rotor 28 and meshes with a fixed externally-toothed gear 34 which is suitable fixed to the outer body end wall 14 (not shown) or fixed to some other suitable structure. The gears 32 and 34 serve to guide the rotor in tracing its epitrochoidal path and in maintaining the relative speed between the rotor and shaft, which in the example shown in 3:1. In the construction of the invention illustrated, the outer body 10 is intended to be stationary and the rotor 28 rotatable relative to said outer body. However, it should be understood that the outer body and rotor may both rotate.

As shown in FIG. 2, a plurality of working chambers 36 are formed between the inner peripheral surface 18 of the peripheral wall 16 and the outer peripheral surface of the rotor 28. During relative rotation of the rotor 28 with the outer body 10, the working chambers 36 vary in volume. The rotor 28 is provided with a plurality of apex portions 38, there being three such apex portions in the embodiment illustrated, which apex portions 38 are disposed for sealing engagement with the inner surface 18 of the peripheral wall 16. In order to maintain sealing of the adjacent working chambers 36 from one another in the peripheral direction, an apex seal member 40 is disposed in a groove in each apex portion 38 of the rotor 28 and is radially movable in said groove for maintaining sealing engagement with the inner surface 18 of the peripheral wall 16 during relative rotation of the rotor 28. The apex seal members 40 are further supported in a grove provided in an intermediate seal member 42 in each apex portion of the rotor for sealing cooperation therewith, which seal members 42 adjacent each apex portion 38 further cooperate with side face seal members 44 provided in each rotor end wall 46 and 48, respectively, to maintain a continuous seal for each working chamber 36. Intake means 50 are provided for supplying a working fluid to the working chambers 36 wherein said working fluid will be compressed in a working chamber and expanded through an exhaust port means 52. If the rotary mechanism is to be operated as a combustion engine, an ignition means such as a spark plug (not shown) may be provided for the ignition of a fuel-air mixture which in this case would comprise the working fluid. It would be apparent, therefore, that, in the case of an internal combustion engine, the four-cycle process of intake, compression, expansion and exhaust would be carried out in each of the working chambers 36.

In order to cool the rotor 28, the rotor is made hollow and cooling oil is supplied thereto through a passageway 54 in the shaft 20 leading from a suitable source of cooling oil (not shown) and a passageway 56 in the eccentric portion 22, which passageway 56 communicates with a hole 58 in the bearing 30 whereby the cooling oil will flow from a sutiable pump and supply source to the interior of the rotor 28. The cooling oil is discharged from the rotor through a passageway 60 provided in the gear 32 or other suitable discharge passageway means so that the oil may flow from the interior of the rotor and collect in a cavity 62 between the rotor and the outer body, which cavity 62 is suitably connected to discharge passageways in the outer body (not shown) so that the oil can be cooled and recirculated. Suitable oil passageway means (not shown) are also provided for supplying oil to the bearings 24 and 26 for lubricating said bearings, which lubricating oil may be supplied and circulated in a known manner.

In order to prevent the cooling and lubricating oil from leaking radially outwardly into the working chambers, oil seal means must be provided. As will be apparent, it is undesirable to permit oil leakage into the working chambers since the presence of oil in said chambers will contaminate the working fluid and also result in undesirable high oil consumption. The present invention provides a novel construction for the oil seal means. Referring to FIG. 1, on the side of the engine opposite from the side including the gears 32 and 34, an oil seal ring 64 is disposed in a groove provided in a disc-like extension 66 of the shaft 20. The oil seal ring 64 is disposed in said extension 66 for sealing in a radial direction against the radially inner surface of the rotor end wall 46 and the walls defined by the groove in said extension 66. Through the use of the oil seal ring 64, the cooling oil present in the interior of the rotor is prevented from leaking axially outwardly into the space 68 defined between the faces of the end wall 46 of the rotor and the end wall 12 of the outer body. An oil seal ring 70 is also disposed axially between the first seal ring means 64 and the bearing 24. The oil seal ring 70 is disposed in a groove 72 formed in a portion of the shaft 20 for sealing against the walls of the groove 72 and the radially inner surface of the end wall 12 disposed adjacent to said groove. As will be apparent, the oil seal ring 70 prevents oil from leaking axially inwardly between the rotor and the end wall 12 so as to prevent oil leakage into the working chambers 36 from this direction.

On the gear side of the rotary mechanism the solution is somewhat more complicated due to the presence of the intermeshing gears 32 and 34. A disc-like element 74 is secured to the eccentric portion 22 for rotation therewith and is concentric with the eccentric portion 22. The disc 74 has a radial extension provided with a groove 76 therein in wihch there is disposed an oil seal ring 78 for sealing engagement with the walls of the groove 76 and the radially inner surface of the rotor end wall 48. An axial extension is also provided on the disc member 74 and has a groove 80 provided therein which carries a seal ring 82 for sealing engagement with the groove walls and the radially inner surface of the end wall 14. Thus, as in the case of the seal means provided on the opposite side of the engine, the seal ring 78 will prevent oil from leaking from the interior of the rotor and the seal ring 82 will prevent oil from leaking axially inwardly from the bearing 26. The disc member 74 is provided with a cut out portion into which the shaft 20 extends and also the fixed gear 34 to permit meshing engagement between the gears 32 and 34 without interference from the disc member 74.

It is inherent in this type of rotary mechanism, due to the bearing tolerances and heat generated during operation, that some gas pressure will leak from the working chambers past the intermediate seal bodies 42 and side face seals 44 into the space 68 between the rotor end wall 48 and outer body end wall 12 and the space 84 defined between the rotor end wall 48 and the outer body end wall 14. This gas pressure leakage aids in biasing the oil seal rings against their associated sealing surfaces to aid in preventing oil leakage. However, it is undesirable to permit this pressure to become too great in that it causes the seal members to be forced radially outwardly with too great a force and results in the seal rings cutting into their abutting surfaces and increasing the rate of wear of seal members.

In order to limit the pressure in the spaces 68 and 84, a relief valve 86 is provided which communicates with the space 68 to a passageway 88. The relief valve 86 in the embodiment illustrated is designed to permit a maximum pressure of approximately 0.5 atmospheric gauge pressure. Further, an axial extending passageway 90 is provided through the shaft 20 and eccentric portion 22 which communicates at one end with the space 68 and at its opposite end with the space 84. Through the passageway 90 the pressure in both spaces 68 and 78 will be balanced so as not to permit a greater pressure on one side of the rotor than on the other side. In order to prevent a communication between the passageway 88 and the relief valve 86 with the working chambers 36, the opening of the passageway 88 to the space 68 is located in the end wall 12 at a position which does not become overrun by the side face seals 44 or the intermediate seals 42. In other words, the opening of the passageway 88 is located radially inwardly of the inner envelope curve traveled by said seal members 42 and 44 and is therefore always at a radially inward position of the space 68.

It has been further found that the gases which leak into the spaces 68 and 84 are substantially fresh gases and are for the greater part still unburnt and can be used again, for example, in combustion in the case of a combustion engine. Thus, the relief valve 86 may be connected to the intake means through its discharge passageway 92, said connection not being shown. Means may also be provided such as providing openings or leakage places in the seal rings for preventing an excessive pressure build-up.

Figure 3:
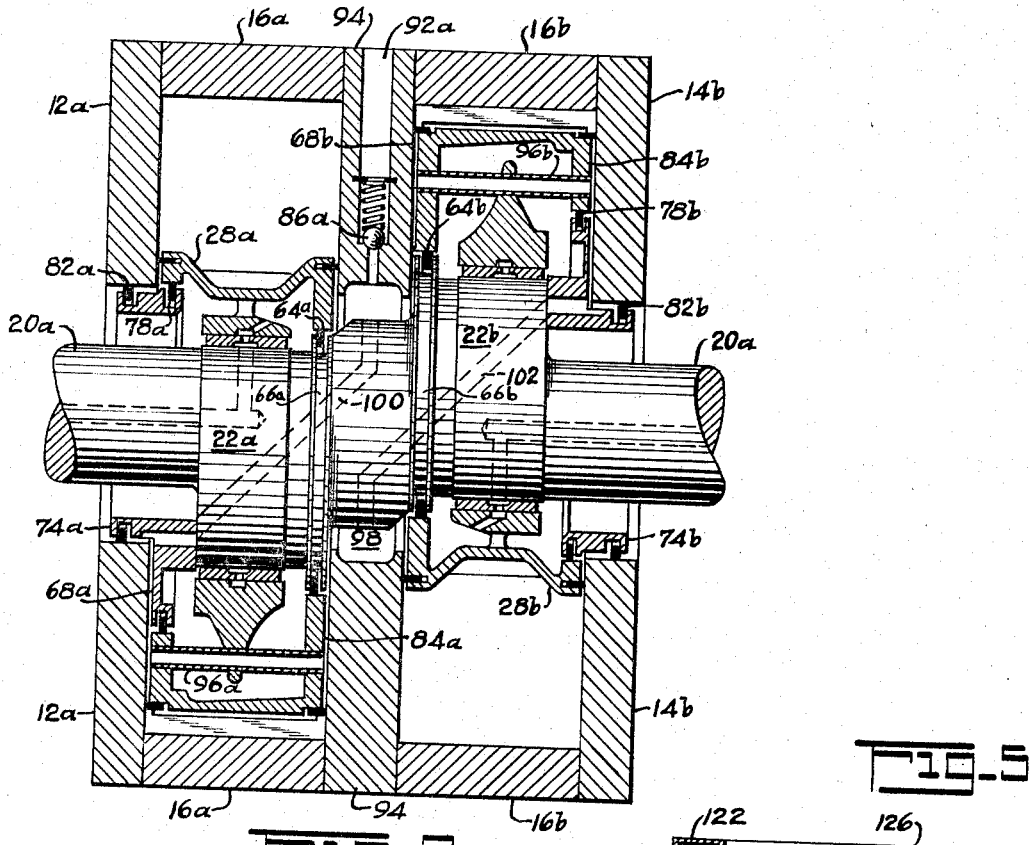
FIG. 3 is an axial sectional view showing the invention embodied in a multi-unit engine.

Referring to FIG. 3, there is shown therein a multi-unit rotary mechanism embodying the invention. The rotary mechanism shown in FIG. 3 is a two-unit mechanism and includes a pair of axially spaced end walls 12a and 14b, peripheral walls 16a and 16b and a common end wall or intermediate wall 94 interconnecting the two peripheral walls 16a and 16b. A shaft 20a is supported for rotation in the rotary mechanism and has eccentric portions 22a and 22b disposed in the respective cavity of each unit of the two-unit rotary mechanism. Rotors 28a and 28b are respectively supported on the eccentric portions 22a and 22b for cooperation with the outer body in the manner described in relation to FIG. 1. Discs 74a and 74b are supported for rotation with the eccentric portion, as described above, on each gear side of the individual unit, the gearing having been removed for purposes of illustration, with the disc members 74a and 74b respectively supporting oil seal members 78a, 82a, and 78b, 82b. Oil seal rings 64a and 64b are respectively carried in grooves 66a and 66b for each unit in the manner described above so that, as will be apparent, the sealing construction thus far described is the same as shown in FIG. 1.

In order to balance the pressure in the spaces between the rotors and their respective associated outer body walls in the embodiment of FIG. 2, a channel is provided through each rotor as shown at 96a and 96b so that the pressure in the spaces 68a, 84a, and 68b, 84b on each side of the associated rotors 28a and 28b will be in communication with one another so that the pressure is not unbalanced on each side of the associated rotor. In order to bleed off excessive pressure, in the manner explained above, a relief valve 86a is provided in the intermediate wall 94 with said relief valve 86a communicating with an annular space 98 in the intermediate wall. The annular space 98 is connected to the space 68a through a passageway 100 in the crank shaft 20a and eccentric portion 22a and with the space 84b through a passageway 102 in said shaft 20a and eccentric portion 22b. It will be seen, therefore, that a single relief valve can be provided for preventing excessive pressure build-up in the sealing system for each of the individual units of the multi-unit rotary mechanism.

It is also possible in rotary mechanisms of the type described herein to provide intake means not only in the peripheral wall as described above, but also in one or both of the end walls. However, in order to use an intake means in the end walls with the sealing construction thus far described, it is necessary that the port, illustrated at 104 in FIG. 2, be located radially outwardly of the outer envelope of the curve traveled by the side face seals 44 and the intermediate seal bodies 42. It would therefore require a somewhat limited construction for an intake port in the end wall, since otherwise the inlet port in the end wall might result in communication between the intake port and the spaces 68 and 84, FIG. 1, so that the necessary pressure would not be able to build up for aiding the seals of the oil seal construction to operate effectively.

Figure 4:
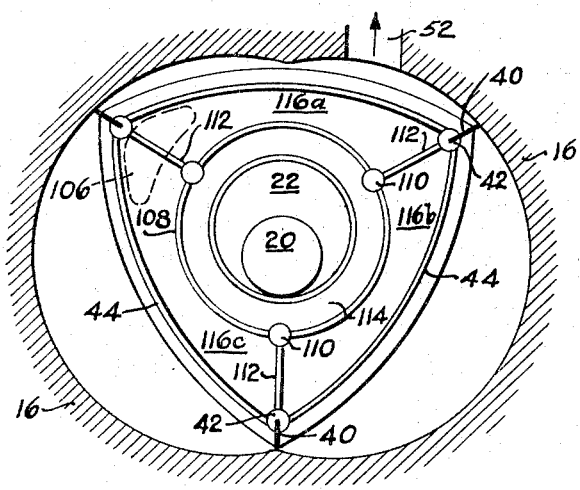
FIG. 4 is a cross-sectional view showing another embodiment of the invention.

FIG. 4 illustrates an embodiment of a rotary mechanism wherein the intake means is located in an end wall of the outer body and comprises a sole intake port 106. As shown therein, when using only an intake means in an end wall or a side intake means, the port 106 for the intake means has to be relaitvely large in order to supply sufficient working fluid to the working chambers. It is also necessary, since the port is relatively large, that the port be overrun by the intermediate seal bodies 42 and the side face seals 44 of the rotor. In order to prevent venting of the space defined between the seals 42, 44 and the oil seal ring means, or the pressure space described above, a second set of annular end face seal means is provided, as shown at FIG. 4, and includes an annular seal ring member 108 and seal pins 110 interconnected with said seal ring 108. The seal ring 108 is comprised of individual seal strips interconnected with the pins 110, which pins 110 are similar to the intermediate sealing bodies 42. The seal ring 108 and the intermediate seal pins 110 are disposed radially inwardly of the intake port 106 so that during rotation of the rotor, the seal members 108 and 110 do not overrun said port 106. Radial seal strips 112 are provided in interconnecting relationship between the seal pins 110 and the intermediate seal bodies 42 to divide the space between the seals 42, 44 and the seals 108, 110 into individual sectors 116a, 116b and 116c. The seals 108 and 110 further define an annular space 114 radially inwardly of said seals which is sealed from the sectors 116a, 116b and 116c defined between radially directed seals 112. It will be seen that even though one of the sectors becomes vented to the intake port 106, so that the gas pressure is lost therefrom, gas pressure will be maintained in at least one other sector. The gas pressure maintained in a sector which is not in communication with the intake port 106 is sufficient to bias the oil seal ring means, previously described, into sealing engagement with their sealing surfaces so that loss of sealing contact does not occur even though one or more of the other sectors may be vented to the intake port 106.

As is known in rotary mechanisms of the type described herein, the rotor not only rotates about its own axis but also has a planetary motion due to its eccentric mounting. The rotor therefore and all parts associated therewith are subjected to acceleration forces which alternate in direction during the planetary motion of the rotor. These acceleration forces also effect the seal rings 64 and 78 which seal between the rotor and the eccentric shaft 20. These seal rings are preferably formed as split rings for assembly purposes and it has been found that at certain speeds of rotation of the rotor the acceleration forces cause the seal rings to lift away from their sealing surfaces, particularly at the split in the rings. The movement of the seal rings away from their sealing surfaces may result in a loss of the cooling fluid out of the interior of the rotor and into the spaces 68 and 84 defined between the rotor and the outer body end walls.

FIG. 5 illustrates an embodiment of a seal ring which avoids this disadvantage. The seal ring illustrated in FIG. 5 is comprised of two U-shaped sections 120 and 122 which are split at 124 and 126, respectively. The sections 120 and 122 of the seal ring 118 are opened toward one another and their respective gaps 124 and 126 are rotated out of alignment with one another so that if one gap should open as a result of the acceleration forces acting thereon, the other section of the seal ring would provide sealing at the gap area. Since the seal rings are made of the two sections 120 and 122, the seal ring 118 has substantially less material than a solid seal ring and the acceleration forces will not act as forcefully thereon than if said ring 118 were a solid mass.

Figure 6:
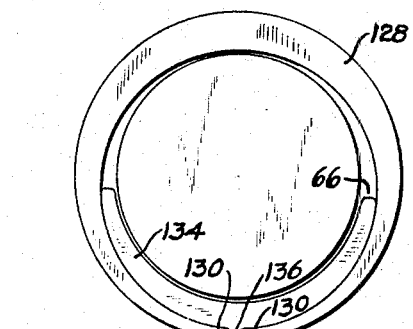
FIG. 6 is a plan view of another seal ring used in the invention.

FIG. 6 illustrates another embodiment of a seal ring which may be used with the rotary mechanism illustrated in FIG. 1. The seal ring 128 of FIG. 6 is formed as a uniform strength beam which has a uniform outer radius and with a decreasing radial width so that the width at the ends 130 of the split seal ring 128 is substantially less than at the portion of the seal ring diammetrically opposite to the ends 130. Since the inner circle of the seal ring 128 is not concentric with the outer circle, the fit inside the seal groove 66, for example, is such that a substantial amount of space is present on one side of the seal ring between the inner surface of the seal ring and the bottom of the seal groove 66. In order to prevent cooling oil from collecting in the space, particularly when the engine is stopped, a crescent-shaped filler piece 134 is placed in the groove between the seal ring and the groove bottom and is provided with a projection 136 which fits into the gap 138 between the seal ring ends 130, which projection 136 keeps the filler piece 134 from shifting in the groove 66. The filler piece 134 is constructed of a material having a low specific weight, for example, carbon, light metal or synthetic resin. The filler piece 134 may be secured against shifting in some other manner than the projection 136, as for example cementing it to the seal ring 128. The uniform strength beam construction of the seal ring 128 provides for uniform deflection of the seal ring in response to forces acting thereon so that uniform sealing will be maintained over the entire outer diameter of the seal ring 128 with its sealing surfaces on the rotor 28.

Furthermore, since the seal ring 128 is constructed as a uniform strength beam, the forces acting thereon will not cause the substantial increase in the width of the gap 138 in reaction to forces applied against the seal ring in the reginon of the gap 138 since the forces will be distributed substantially uniformly over the entire seal ring structure.

From the above description, it will be seen that a novel oil sealing arrangement is provided for a rotary mechanism which is effective and relatively simple in construction. The invention makes use of the gas pressure leakage in the working chamber to aid in maintaining sealing between the oil seal means and its associated sealing surfaces. Means are also provided for preventing the pressure used for aiding in effective sealing from building up so that this pressure does not press the seals too greatly against their sealing surfaces which might result in an increase in wear and loss of sealing efficiency.

Although the invention has been set forth in its preferred embodiments in the above description, it will be obvious to those skilled in the art that modifications may be made therein without departing from the spirit and scope of the invention as defined in the appended claims.

We claim:

1. An oil seal construction for a rotary mechanism comprising at least one unit, said rotary mechanism unit having an outer body including a pair of spaced end walls interconnected with a peripheral wall to form a cavity, a shaft supported for rotation in said outer body and having an eccentric portion thereon, a rotor supported for relative rotation on said eccentric portion and carrying apex seal means for sealing engagement with the inner surface of said peripheral wall and seal means in each side face thereof disposed adjacent the outer periphery of said rotor for sealing engagement with the axial facing inner surface of an associated outer body end wall, and a plurality of working chambers defined between the inner surface of said peripheral wall and the outer peripheral surface of said rotor which vary in volume during relative rotation of said rotor with said outer body, said oil seal construction comprising; first and second seal groove means carried by said shaft, said first seal groove means including a seal groove disposed adjacent each outer body end wall and said second seal groove means including a seal groove disposed adjacent each end wall of said rotor, first oil seal ring means carried by said first seal groove means for sealing engagement between the inner surface of each of said outer body end walls and the walls of said first seal groove means and second oil seal ring means carried by said second seal groove means for sealing engagement between the inner surface of said rotor end walls and the walls of said second seal groove means whereby oil is prevented from flowing into the spaces defined between said outer body, said rotor and said shaft.

2. An oil seal construction for a rotary mechanism as recited in claim 1 wherein an annular space is defined between the axially confronting faces of said outer body end walls and said rotor and the outer surface of said shaft, said annular spaces being subject to gas pressure from said working chambers and said gas pressure in said annular spaces being operative for maintaining said oil seal ring means in sealing engagement with their associated sealing surfaces.

3. An oil seal construction for a rotary mechanism as recited in claim 2 further comprising passage means connecting the annular space on each side of said rotor for balancing the gas pressure between said annular spaces.

4. An oil seal construction for a rotary mechanism as recited in claim 3 further comprising relief valve means disposed in communication with said annular spaces for limiting the gas pressure in said annular spaces to a maximum value.

5. An oil seal construction for a rotary mechanism as recited in claim 1 wherein said one rotary mechanism unit further includes an internally-toothed gear surrounding said shaft and said first and second seal groove means on the gear side of said unit being disposed in a disc carried by said shaft eccentric portion with said disc being supported coaxially with said eccentric portion.

6. An oil seal construction for a rotary mechanism as recited in claim 2 wherein said rotary mechanism includes two axially aligned units interconnected by a common end wall and each of said units having annular spaces defined between the axially confronting faces of their respective rotors and outer body end walls and the outer surface of said shaft, said oil seal construction further comprising passage means for each unit interconnecting the annular spaces on each side of their respective rotors with the passage means for each unit being in communication with a common annular cavity in said common end wall and relief valve means disposed in said common end wall and in communication with said anular cavity so that the gas pressure in said annular spaces is limited to a maximum value.

7. An oil seal construction for a rotary mechanism as recited in claim 1 wherein said rotary mechanism further includes intake means for supplying a working fluid to said working chambers, said intake means including an intake port disposed in said peripheral wall and at least one intake port disposed in an outer body end wall with said end wall intake port being positioned radially outwardly of the path traced by said rotor side face seals during rotation of said rotor.

8. An oil seal construction for a rotary mechanism as recited in claim 1 wherein said rotary mechanism further includes intake means for supplying a working fluid to said working chambers, an intake port disposed in an outer body end wall with said intake port being positioned in the path traced by said rotor side face seals carried by each side face of said rotor, and annular side face seals being disposed radially inwardly of said first-mentioned side face seals such that during rotation of said rotor said annular side face seals always remain radially inwardly of said intake port and radially disposed seal means including a plurality of radially disposed seal members carried by said rotor in operative sealing engagement between said first-mentioned side face seal means and said annular side face seal means with adjacent pairs of said radially disposed seal members dividing the space between said first-mentioned side face means and said annular side face seal means into separate sealed sectors such that when one of said sectors overruns said intake port another of said sectors maintains sealing pressure therein.

9. An oil seal construction for a rotary mechanism as recited in claim 1 wherein each oil seal ring of at least said second oil seal ring means comprises at least two split U-shaped ring members disposed in facing relationship with the splits in said ring members being offset from one another.

10. An oil seal construction for a rotary mechanism as recited in claim 1 wherein at least one of said oil seal rings comprises a split ring member having a mass that decreases per unit length in the direction toward its ends.

11. An oil seal construction for a rotary mechanism as recited in claim 10 wherein said oil seal ring has a uniform outer radius and a width that decreases toward its ends.

12. An oil seal construction for a rotary mechanism as recited in claim 11 wherein said oil seal ring end sections are constructed as uniform-strength beams.

13. An oil seal construction for a rotary mechanism as recited in claim 12 wherein a filler piece is provided in the oil seal ring groove in the region of minimum width of said oil seal ring and said filler piece being composed of a material of lower specific weight than the material of said oil seal ring.

References Cited
UNITED STATES PATENTS

| | | | |
|---|---|---|---|
| 1,831,263 | 11/1931 | Ross | 123—8 |
| 2,988,065 | 6/1961 | Wankel et al. | 103—130 |
| 3,102,520 | 9/1963 | Schlor | 123—8 |
| 3,179,331 | 4/1965 | Paschke et al. | 230—145 |
| 3,196,850 | 7/1965 | Jones | 123—8 |
| 3,204,614 | 9/1965 | Huber | 123—8 |
| 3,206,109 | 9/1965 | Paschke | 123—8 |
| 3,249,094 | 5/1966 | Hoppner et al. | 230—145 |
| 3,251,541 | 5/1966 | Pasche | 123—8 |
| 3,261,542 | 7/1966 | Jones | 123—8 |
| 3,269,370 | 8/1966 | Paschke et al. | 123—8 |

DONLEY J. STOCKING, Primary Examiner.

W. J. GOODLIN, Assistant Examiner.